Patented Sept. 13, 1932

1,877,717

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

NITROCELLULOSE CEMENT

No Drawing.   Application filed February 28, 1924.   Serial No. 695,804.

This invention relates to a cement intended for cementing wood, leather and other substances and relates especially to a nitrocellulose solution adapted for cementing the laps of leather belts in order to make a waterproof joint. Belt cements have been made heretofore from nitrocellulose by dissolving soluble cotton in acetone, ethyl acetate or other volatile solvent. Cheaper compositions have been made from scrap celluloid dissolved in acetone, the proportions usually being about one pound of the celluloid scrap per gallon of acetone or methyl acetone. The use of soluble cotton involves considerable expense as it is relatively costly. On the other hand celluloid scrap produces solutions of high viscosity so that twelve to sixteen ounces per gallon of the celluloid makes about as stiff a composition as will spread well on the leather surface.

In the present invention concentrated solutions of nitrocellulose are used, such nitrocellulose material being treated to reduce its viscosity. Preferably the nitrocellulose is by-product material such as celluloid comb scrap or moving picture film which has been washed to remove the gelatine emulsion. Or any other form of celluloid waste such as trimmings, shavings and the like may be used.

Such material may be dissolved in a solvent such as acetone to make solutions ranging from 20 to 50 per cent concentration, that is in 100 parts by weight of the finished cement there will be 20 to 50 parts of the de-viscolized nitrocellulose. As stated heretofore with ordinary celluloid lower concentrations are employed because the composition does not spread readily or sets too quickly. The use of such low concentrations as has heretofore been practiced results in a great waste of solvent material and renders necessary the sizing of the belt laps with the composition before applying the final cementing coat. This is necessary in order to obtain a sufficient amount of solid cementing material to exert the proper binding effect.

In the present invention a solution of 20 to 50 per cent concentration as stated may be treated with an alkali such as caustic soda or caustic potash but preferably with ammonia. The latter has distinct advantages owing to the fact that acetone in the cold may be saturated with the gas and the celluloid scrap or moving picture film dissolved therein. On standing in the cold or at room temperature a gradual reduction in viscosity occurs. Several days may be required at room temperature to secure the desired degree of reduction. This effect may be reached in about 2 hours time by heating in a closed vessel at 50° C. The celluloid scrap or moving picture film may be reduced in viscosity simply by heating in a non-solvent such as a concentrated aqueous solution of calcium chloride to a temperature of say 120° C. for 1 or 2 hours. Or it may be exposed to a dry heat at a temperature below its decomposition point but sufficiently elevated to bring about a reduction in viscosity. However such heating methods have certain explosion hazards and the method of treatment by alkali reagents in the cold or at slightly elevated temperatures after the nitrocellulose has been put into solution is a safer procedure.

A method of this kind is carried out very simply by passing ammonia gas into acetone at a temperature preferably somewhat below 20° C. A temperature between 10 and 20° C. is satisfactory. Such a saturated solution of the gas in acetone may be used directly or it may be diluted with acetone or other appropriate solvent before the celluloid is added. If the composition warrants agitation is preferably during the digesting stage during which period the viscosity is reduced. In making solutions containing equal parts of celluloid and ammoniacal solvent the consistency at first is that of a stiff jelly but on standing or warming gently a viscous syrup results.

These concentrated solutions of de-viscolized celluloid carrying from say 20 per cent to 50 per cent of celluloid may be used directly as a belt cement. Preferably a proportion of 30 to 40 per cent of the celluloid is employed as with this range, say around 35 per cent, sufficient solid material is present to exert a good binding effect. Whereas with concentrations of say 50 per cent strength the penetration in and around the leather fibres is not as satisfactory.

Softening or flexibilizing agents may be added such as diethylphthalate, butyl tartrate, castor oil, blown rape oil and the like. Too great an amount of softening agent should not be added otherwise the celluloid which already contains camphor or some similar plasticizing agent will fall off in binding power. As a rule not over 3 to 5 per cent and ordinarily at most not over about 10 per cent of softening agent is required.

Likewise if desired one may add a certain amount of resinous material such as dammar or shellac or synthetic resins such as phthalic glyceride resin or rosin phthalic glyceride resin. However the addition of resins tends to decrease strength and flexibility and the amount added in most cases should not exceed more than a few per cent.

The addition to any of the foregoing compositions of ordinary soluble cotton is not precluded although such additions tend to increase the cost of manufacture. It is also possible to use other forms of nitrocellulose such as smokeless powder. Any form of gelatinized or gelatinated nitrocellulose especially by-product material which may be obtained cheaply may be used. White cements of course require material which is light in color.

While I have mentioned acetone as the preferred solvent material I may use other ketones such as methyl ethyl ketone, alcohol, ether mixtures, acetone and benzol mixtures, ethyl acetate, methyl acetone and the like.

The effect of the ammonia may be arrested at any time by the addition of a neutralizing agent such as the requisite amount of sulphuric, hydrochloric or phosphoric acids.

Cements made in accordance with my invention may be prepared of relatively high concentration and still be free spreading due to the use of celluloid of artificially-reduced viscosity; that is celluloid which has been exposed to heat or treated with chemical agents so that its viscosity in solution is substantially lower than the normal one.

By the term "de-viscolized" celluloid it is intended to cover celluloid material after it has been subjected to a process for reducing its viscosity as by treatment with alkali, particularly ammonia, as hereinabove set forth.

What I claim is:—

1. A free-spreading belt cement comprising a solution of ammonia-treated celluloid containing at least twenty per cent of such treated celluloid.

2. A liquid cement comprising a solution of alkali-treated gelatinated nitrocellulose of reduced viscosity containing at least twenty per cent of such nitrocellulose.

3. A cement consisting of a solution in a volatile solvent of celluloid, reduced in viscosity by treatment with an alkali, the concentration of the solution ranging between 20 and 50 per cent of said celluloid.

4. A composition adapted as a belt cement comprising approximately a thirty-five per cent solution of celluloid reduced in viscosity by treatment with an alkali.

5. A belt cement comprising a solution of gelatinous nitrocellulose reduced in viscosity by treatment with an alkali, in a volatile solvent forming a solution between thirty and forty per cent of said nitrocellulose and having the property of spreading freely.

6. A free-spreading belt cement comprising a concentrated solution of celluloid reduced in viscosity by treatment with an alkali.

7. A solution adapted for use as a cementing agent comprising nitrocellulose reduced in viscosity by treatment with an alkali, in a volatile solvent, the concentration of the nitrocellulose being at least 20%.

8. A composition adapted for use as a cementing agent comprising a concentrated solution of nitrocellulose reduced in viscosity by treatment with an alkali, in a volatile solvent.

CARLETON ELLIS.